L. V. WINTER.
COOKING UTENSIL.
APPLICATION FILED JULY 15, 1919.

1,328,702. Patented Jan. 20, 1920.

2 SHEETS—SHEET 1.

WITNESSES
J H Lapish
W H Buckley

INVENTOR
L. V. WINTER
BY Munn & Co.
ATTORNEYS

L. V. WINTER.
COOKING UTENSIL.
APPLICATION FILED JULY 15, 1919.
1,328,702. Patented Jan. 20, 1920.
2 SHEETS—SHEET 2.
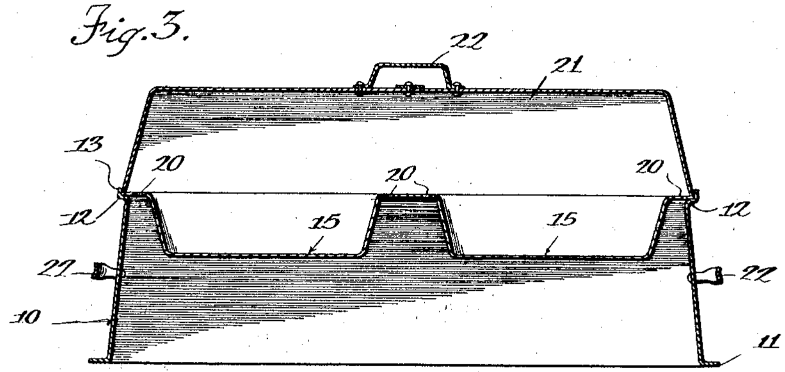
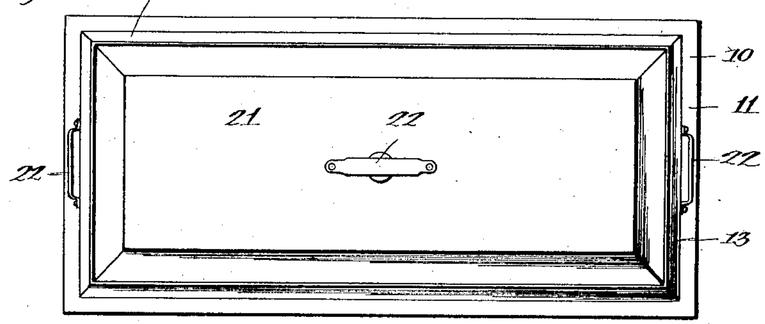
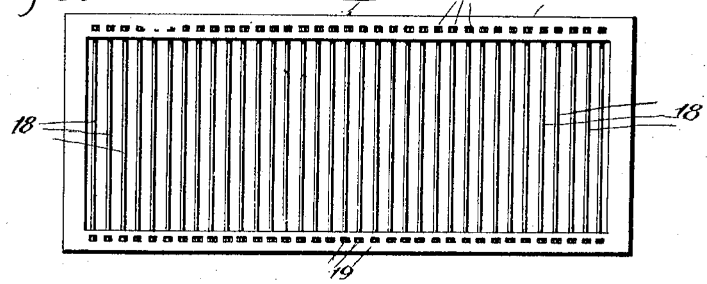
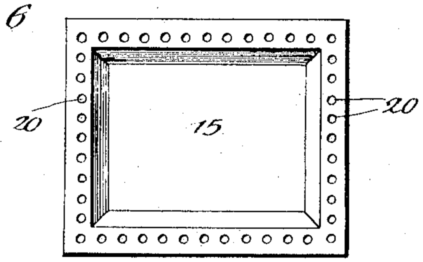
WITNESSES
INVENTOR
L. V. WINTER
BY
ATTORNEYS

UNITED STATES PATENT OFFICE.

LLOYD VALENTINE WINTER, OF JUNEAU, TERRITORY OF ALASKA.

COOKING UTENSIL.

1,328,702. Specification of Letters Patent. Patented Jan. 20, 1920.

Application filed July 15, 1919. Serial No. 310,954.

*To all whom it may concern:*

Be it known that I, LLOYD VALENTINE WINTER, a citizen of the United States, residing at Juneau, Territory of Alaska, have invented certain new and useful Improvements in Cooking Utensils, of which the following is a specification.

My invention relates generally to improvements in cooking utensils and more particularly to an improved cooking utensil adapted to serve either as a broiler or a boiler.

An important object of my invention is to provide an improvement of this type in which the fumes and disagreeable odors resulting from the cooking of the food are not allowed to escape into the room or place in which the cooking is being carried on but are conveyed back to the stove and are disposed of in the same manner as the gases of combustion in the stove.

Another object of my invention is to provide an improvement of this kind of simple construction and operation, durable, reliable in practice, and inexpensive and easy to manufacture.

Figure 1:
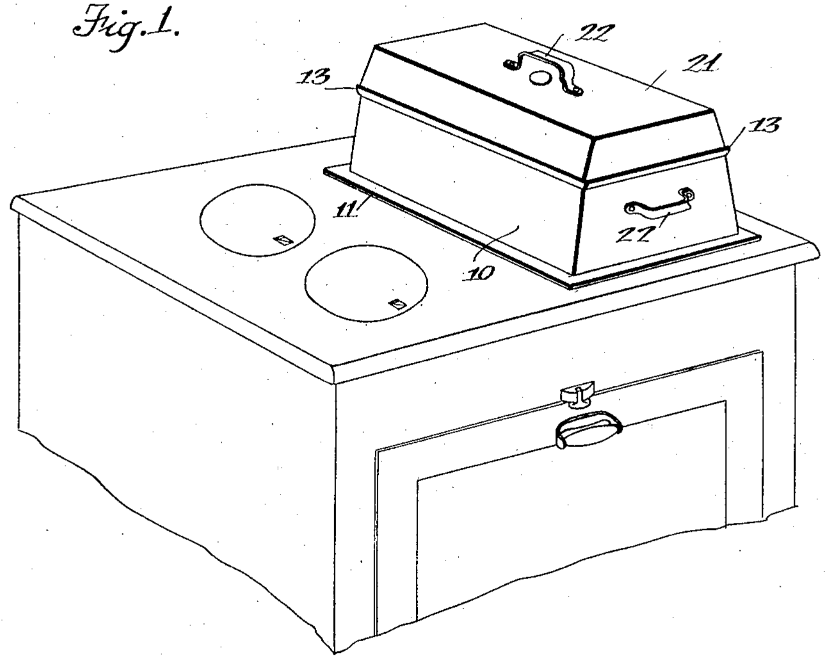
Figure 2:
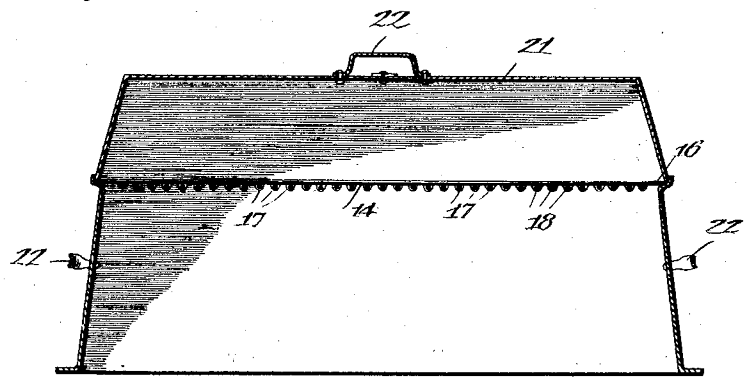

Other objects and advantages reside in certain features of the construction, arrangement and combination of parts and will become apparent as the description proceeds, reference being had to the accompanying drawings forming part of this specification and in which;

Figure 1 is a perspective view showing my improved cooking utensil in position on the stove as is customary in practice, Fig. 2 is a vertical cross section showing my improvement when adapted to be used as a broiler, Fig. 3 is a vertical section showing my improvement when adapted to be used as a boiler, Fig. 4 is a plan view of my improvement assembled, Fig. 5 is a detail view showing the grid iron in plan, Fig. 6 is a detail view showing in plan the cooking receptacle adapted to be utilized with my improvement when it is employed as a boiler or the like.

Referring to the drawings it will be seen my invention comprises a base section 10 preferably of rectangular cross section and decreasing in cross sectional area from its lower to its upper end. This base section is provided at its lower end with an outwardly extending flange 11 which extends entirely around the periphery of the base section and forms the base thereof. The upper end of the base section is bent outward to form a supporting ledge 12 and then upward to form an upstanding flange 13 both of which are integral with the base section. The entire base section including of course the supporting ledge and the upstanding flange, is preferably constructed of sheet metal. As shown in Figs. 2 and 3 the base section is open at both top and bottom.

The supporting ledge 12 is adapted to support the cooking means which may be either the grid iron indicated generally by 14 as shown in Fig. 2 or the cooking receptacle indicated generally by 15 in Fig. 3 accordingly as it is desired to use the improvement as a broiler or a boiler or the like.

The grid iron as shown applied in Fig. 2 and detail in Fig. 5 comprises a rectangular frame 16 preferably of sheet metal. The frame is provided with apertured ears 17 punched from its longer sides and these apertured ears constitute the supports for the grid bars 18. The metal forming these apertured ears being punched from the frame provide vents 19 the purpose of which will be hereinafter more fully described. It is to be understood that the size of the frame, is such and it is so arranged as to provide a substantial portion for resting against the supporting ledge and to have the portion or flange provided with the vents 19 so disposed as to be clear of the supporting ledge so that these vents may provide unobstructed passages.

The cooking receptacles 15, preferably two in number are applied as shown in Fig. 3. Each of these receptacles have at their top an outwardly extending marginal flange. This flange is disposed substantially horizontal and extends entirely around the periphery of the receptacle. The flange is provided with a plurality of vents 20 as shown in Fig. 6 and this flange is also of such a size and so arranged as to provide a substantial portion for resting against the supporting ledge and to have the flange provided with the vents 20 so disposed as to be clear of the supporting ledge so that these vents may provide unobstructed passages.

It is apparent that whether the grid iron or the cooking receptacle is employed they are securely supported by the ledge 12 and the coöperating flange 13. A cover 21 rests against the marginal flanges of the receptacles or the frame of the grid iron and serves to maintain them in their proper position, the cover itself being maintained in proper position by action of the flange 13 as shown in Figs. 2 and 3.

Suitable handles as shown at 22 are provided for the base section and the cover.

In practice the utensil is placed on the stove as shown in Fig. 1, and the grid iron or the cooking receptacles are mounted therein as desired. The lids of the stove having been removed the open bottom of the base section provides for free communication with the combustion chamber of the stove. As the food on the grid iron or in the receptacles is cooked the fumes therefrom will pass upwardly until they strike the under surface of the cover and this contact reduces their temperature so that they descend through the vents 19 or 20 and thence into the stove where they pass out into the chimney with the gases of combustion. In this manner a maximum of efficiency in the cooking of the food is obtained and any disagreeable fumes or odors are carried over and not allowed to enter the room or place in which the cooking is being carried on. It is obvious that the cooking receptacle and the cover section define a commodity or food receiving space adequate to accommodate and entirely inclose even the more bulky foods.

I claim:

1. A cooking utensil comprising a base section provided with a support and having an open top and bottom, said section being adapted to be placed over a stove in open communication with the combustion chamber thereof, cooking means having its main portion exposed to the heat of combustion and having a marginal flange mounted on the support of the base section, said marginal flange being provided with vents spaced from the portion of the flange resting on the support of said base section to allow passage of fumes downwardly therethrough and through the base section into the stove, and a cover section resting upon the upper face of the portion of said flange resting on the support of said base section, the inner surface of said cover section being adapted to cool the fumes and constrain them to flow downwardly through said vents.

2. A cooking utensil comprising a base section provided with a support and having an open top and bottom, said base section being adapted to be placed over a stove in open communication with the combustion chamber thereof, a grid-iron having a marginal flange resting upon said support, said marginal flange having apertured ears punched therefrom providing openings constituting vents to allow passage of fumes downwardly through the base section and into the stove, grid bars mounted in said apertured ears, and a cover section mounted on said support, all as and for the purposes set forth.

3. A grid-iron comprising a frame, apertured ears punched therefrom providing openings constituting vents, and grid-bars mounted in said apertured ears.

4. A grid iron comprising a frame, apertured ears punched therefrom and grid bars mounted in said apertured ears.

5. A grid iron comprising a rectangular frame having vents therein, apertured ears punched therefrom and grid bars supported in said apertured ears.

LLOYD VALENTINE WINTER.